(12) United States Patent
Watanabe et al.

(10) Patent No.: US 7,995,256 B2
(45) Date of Patent: Aug. 9, 2011

(54) TRANSPARENT CARD WITH HOLOGRAM, AND APPARATUS FOR RECOGNIZING TRANSPARENT CARD WITH HOLOGRAM

(75) Inventors: Masachika Watanabe, Tokyo (JP); Mitsuru Kitamura, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 11/481,338

(22) Filed: Jul. 5, 2006

(65) Prior Publication Data

US 2007/0008595 A1      Jan. 11, 2007

(30) Foreign Application Priority Data

Jul. 6, 2005 (JP) .................................. 2005-198159

(51) Int. Cl.
*G03H 1/00* (2006.01)

(52) U.S. Cl. ............................................. 359/2; 283/85

(58) Field of Classification Search ........ 359/2; 430/10; 283/86, 85
See application file for complete search history.

(56) References Cited

U.S. PATENT DOCUMENTS

| | | | | |
|---|---|---|---|---|
| 3,620,590 | A * | 11/1971 | Barker | 380/54 |
| 4,856,857 | A * | 8/1989 | Takeuchi et al. | 359/3 |
| 5,486,933 | A * | 1/1996 | Shindo et al. | 359/2 |
| 5,546,198 | A | 8/1996 | van der Gracht et al. | |
| 7,101,644 | B2 * | 9/2006 | Toshine et al. | 430/1 |
| 2004/0027627 | A1 | 2/2004 | Kitamura | |
| 2006/0199105 | A1 * | 9/2006 | Cahill | 430/270.11 |
| 2006/0221422 | A1 | 10/2006 | Mizushima et al. | |
| 2006/0262367 | A1 * | 11/2006 | Hattori et al. | 359/15 |

FOREIGN PATENT DOCUMENTS

| | | |
|---|---|---|
| DE | 2 324 381 | 11/1973 |
| DE | 101 37 833 A1 | 11/2002 |
| GB | 1 393 662 | 5/1975 |
| JP | 2001-334779 A | 12/2001 |
| JP | 2004-077548 A | 3/2004 |
| JP | 2005-103957 | 4/2005 |
| WO | 02-084588 A1 | 10/2002 |
| WO | 2005/022275 A1 | 3/2005 |

* cited by examiner

*Primary Examiner* — Alessandro Amari
(74) *Attorney, Agent, or Firm* — Ladas & Parry LLP

(57) ABSTRACT

A main object of the present invention is to provide a transparent card with a hologram having the excellent design property and a high security property. The present invention achieves the object by providing a transparent card with a hologram, characterized by comprising a configuration with a transparent card substrate made of a resin transparent with respect to a visible light, and a hologram layer having a computer generated hologram part to function as a transmission type Fourier transform lens laminated.

2 Claims, 4 Drawing Sheets

TRANSPARENT CARD WITH HOLOGRAM, AND APPARATUS FOR RECOGNIZING TRANSPARENT CARD WITH HOLOGRAM

BACKGROUND OF THE INVENTION

1. Field of the Invention

The present invention relates to a transparent card with a hologram, having the excellent design property and a high security property.

2. Description of the Related Art

The hologram is produced by having two lights of the same wavelength (object light and reference light) interfere with each other so as to have the wave surface of the object light recorded on a sensitive material as interference fringes. If a light of the same condition as the original reference light is directed to the hologram, the diffraction phenomenon is generated by the interference fringes so that the same wave surface as the original object light can be reproduced. The hologram can be classified into several kinds (surface relief type hologram, volume type hologram, or the like) according to the recording form of the interference fringes generated by the interference of a laser beam or a light of the excellent coherence property.

Since the hologram has the advantages such as the beautiful external appearance and the difficulty in copying the same design, it is used frequently for the security application, or the like. In particular, as to the plastic cards represented by the credit cards, the cash cards or the like, a card with a hologram is broadly used mainly from the viewpoint of the copy prevention and the design property contribution. As the hologram used for the cards with a hologram, a surface-relief reflection type hologram with the interference fringes recorded by applying a minute concavo-convex shape on the hologram formed layer surface is commonly used.

However, recently, it is pointed out that the relief type hologram can be copied easily so that deterioration of the copy prevention function by applying a hologram on a plastic card is regarded problematic. Moreover, according to a transparent card referred to as a skeleton card disclosed in the Japanese Patent Application Laid-Open (JP-A) No. 2005-103957, deterioration of the design property derived from the transparency in the case of applying the conventional reflection type hologram has been pointed out, and thus incapability of utilizing the advantage of the transparent card with the excellent design is regarded problematic.

SUMMARY OF THE INVENTION

The present invention has been achieved in view of the above-mentioned problems, and a main object thereof is to provide a transparent card with a hologram having the excellent design property and a high security property.

To achieve the object, the present invention provides a transparent card with a hologram, characterized by comprising a configuration with a transparent card substrate made of a resin transparent with respect to a visible light, and a hologram layer having a computer generated hologram part to function as a transmission type Fourier transform lens laminated.

According to the present invention, since the hologram layer has the computer generated hologram part to function as a transmission type Fourier transform lens, a transparent card with a hologram having the high security property such as the copy prevention function can be obtained. Moreover, since the computer generated hologram part of the hologram layer has the Fourier transform lens function of transforming a light incident from the point light source to a predetermined image and a transmitted light transmitting the hologram layer is changed to a predetermined optical image by the Fourier transform lens function, a transparent card with a hologram having the high design property can be obtained.

In the above-mentioned invention, it is preferable that the hologram layer is formed in the uppermost layer. Since the hologram layer is formed in the uppermost layer, the transparent card substrate and the hologram layer can be laminated easily, and thus the transparent card with a hologram of the present invention can provide the excellent productivity.

Moreover, the above-mentioned invention may have a configuration with a plurality of the transparent card substrates laminated on the both sides of the hologram layer. According to the configuration with the transparent card substrates laminated on the both sides of the hologram layer, disturbance of the optical image obtained with the computer generated hologram part by the adhesion of the dirt such as water and oil on the computer generated hologram part of the hologram layer can be prevented. Moreover, according to the above-mentioned configuration, since the hologram layer is present inside the cards, duplication of the computer generated hologram part can be prevented so that a transparent card with a hologram with the excellent security property can be obtained.

Moreover, in the above-mentioned invention, the transparent card substrate and the hologram layer may be bonded by a heat seal layer made of a thermoplastic resin. For example, when the transparent card substrate is made of a thermosetting resin, or the like, by having the heat seal layer made of a thermoplastic resin, the adhesion property between the transparent card substrate and the hologram layer can be improved.

Moreover, in the above-mentioned invention, it is preferable that the computer generated hologram part comprises a phase hologram. By the use of the phase hologram, a transparent card with a hologram having even more excellent design property can be obtained.

The present invention provides an apparatus for recognizing a transparent card with a hologram characterized by comprising a point light source; a supporting part for supporting a transparent card with a hologram, disposed such that a light from the point light source is incident on the transparent card with a hologram; and a light receiving part for receiving a light transmitted the transparent card with a hologram supported by the supporting part.

According to the present invention, since the optical image obtained by the transparent card with a hologram can be recognized by a transmission light from a point light source, an apparatus for recognizing a transparent card with a hologram having little card identifying property decline can be obtained even when for example, the transparent card with a hologram is inclined or deformed. Moreover, according to the present invention, since the optical image can be recognized by a transmission light from a point light source without the need of a complicated optical system, a simple apparatus for recognizing a transparent card with a hologram can be obtained.

The present invention provides the effect of providing a transparent card with a hologram having the excellent design property and a high security property.

DETAILED DESCRIPTION OF THE PREFERRED EMBODIMENTS

Hereinafter, a transparent card with a hologram and an apparatus for recognizing a transparent card with a hologram of the present invention will be explained in detail.

A. Transparent Card with a Hologram

First, the transparent card with a hologram of the present invention will be explained. The transparent card with a hologram of the present invention has a configuration with a transparent card substrate made of a resin transparent with respect to a visible light, and a hologram layer having a computer generated hologram part to function as a transmission type Fourier transform lens laminated.

Figure 1:
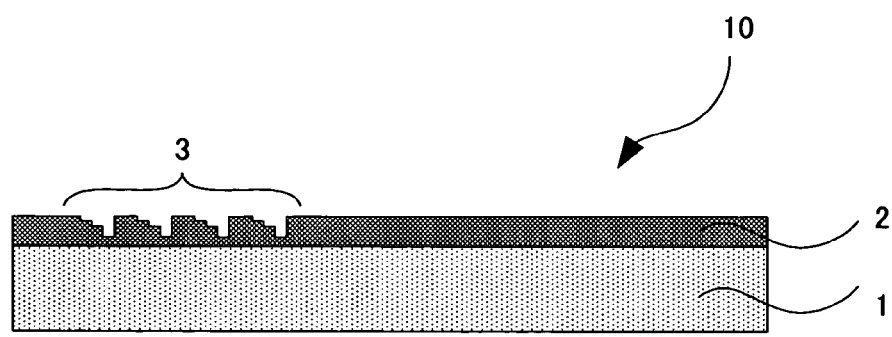
FIG. 1 is a schematic cross sectional view showing an example of a transparent card with a hologram of the present invention.

Next, the transparent card with a hologram of the present invention will be explained with reference to the drawings. FIG. 1 is a schematic cross sectional view showing an example of a transparent card with a hologram of the present invention. As shown in FIG. 1, the transparent card with a hologram 10 of the present invention has a configuration with a transparent card substrate 1 and a hologram layer 2 laminated.

In FIG. 1, since the transparent card substrate 1 is made of a resin transparent with respect to a visible light, a light of the visible light range can be transmitted. Moreover, the hologram layer 2 has a computer generated hologram part 3 to function as a Fourier transform lens, with a minute concavo-convex shape formed in the surface of the computer generated hologram part 3. Such a computer generated hologram part 3 has a function of a Fourier transform lens to convert a light incident from a point light source to a predetermined optical image. Moreover, the light diffraction angle in the computer generated hologram part 3 is determined by the form of the minute concavo-convex shape formed in the surface of the computer generated hologram part 3.

Figure 2:
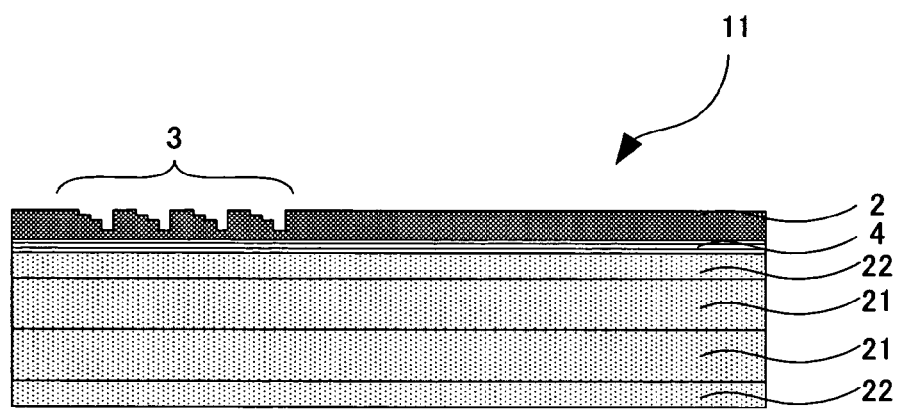
FIG. 2 is a schematic cross sectional view showing another example of a transparent card with a hologram of the present invention.

FIG. 2 is a schematic cross sectional view showing another example of a transparent card with a hologram of the present invention. As shown in FIG. 2, the transparent card with a hologram 11 of the present invention may have a configuration using a core sheet 21 and an over sheet 22 made of a resin transparent with respect to a visible light as the transparent substrate, with the two core sheets 21 sandwiched between the over sheets 22, and the hologram layer 2 laminated on the over sheet 22. Moreover, as shown in FIG. 2, according to the transparent card with a hologram 11 of the present invention, a heat seal layer 4 made of a thermoplastic resin may be provided for laminating the hologram layer 2 on the over sheet 22 as the transparent card substrate.

Figure 3A:
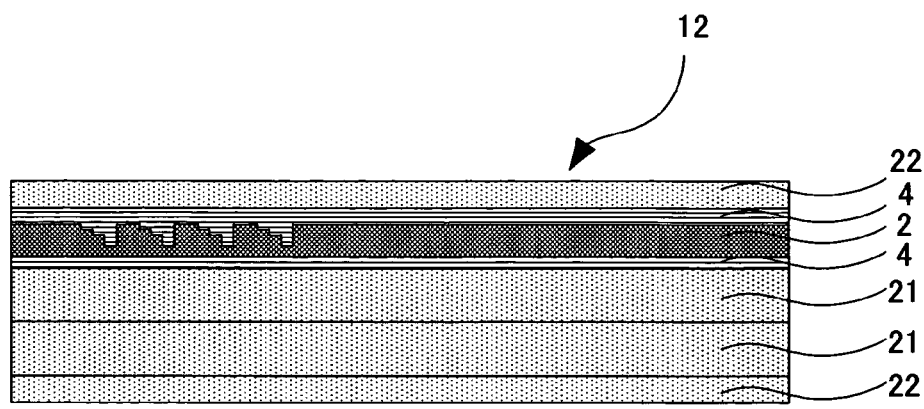
FIGS. 3A to 3B are schematic cross sectional views showing other examples of a respective transparent card with a hologram of the present invention.
Figure 3B:
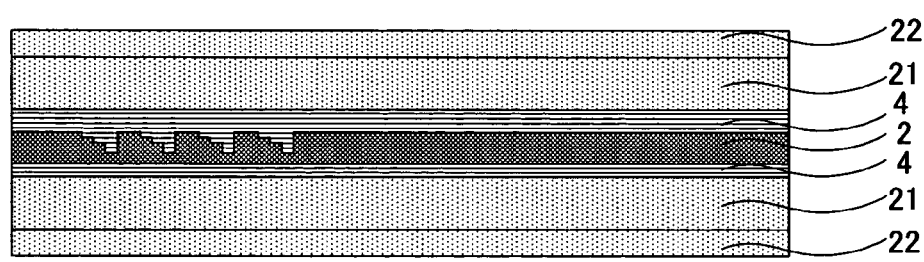

FIGS. 3A to 3B are schematic cross sectional views showing a still other examples of a transparent card with a hologram of the present invention. As shown in FIG. 3A, the transparent card with a hologram of the present invention 12 has a configuration using a core sheet 21 and an over sheet 22 made of a resin transparent with respect to a visible light as the transparent card substrate, with the two core sheets 21 laminated on the over sheet 22 and a hologram layer 2 formed on the core sheets 21 via a heat seal layer 4 made of a thermoplastic resin, and furthermore, another over sheet 22 may be laminated as the transparent card substrate laminated on the hologram layer 2 via the heat seal layer 4.

Moreover, as shown in FIG. 3B, it may have a configuration with a set of the core sheet 21 and the over sheet 22 as the transparent card substrate laminated in this order on the both sides of the hologram layer 2 via the heat seal layer 4.

As mentioned above, according to the transparent card with a hologram of the present invention, since the hologram layer has the computer generated hologram part to function as a transmission type Fourier transform lens, a transparent card with a hologram having a high security property such as the copy prevention function can be obtained. Moreover, since the computer generated hologram part of the hologram layer has a Fourier transform lens function to convert a light incident from a point light source into a predetermined image so that a transmitted light to transmit through the hologram layer is converted to a predetermined optical image by such a Fourier transform lens function, a transparent card with a hologram having a high design property can be obtained by the present invention.

The transparent card with a hologram of the present invention has a configuration comprising at least a hologram layer and a transparent card substrate laminated. Hereinafter, each configuration of the transparent card with a hologram of the present invention will be explained in detail.

1. Hologram Layer

First, the hologram layer to be used for a transparent card with a hologram of the present invention will be explained. The hologram layer in the present invention has a computer generated hologram part to function as a Fourier transform lens.

(1) Computer Generated Hologram Part

The computer generated hologram part of the hologram layer will be explained. The above-mentioned computer generated hologram part is a portion to function as a computer generated hologram having the nature as a Fourier transform lens. In the present invention, since the hologram layer has such a computer generated hologram part, a transparent card with a hologram having the excellent design property can be obtained.

Figure 4A:
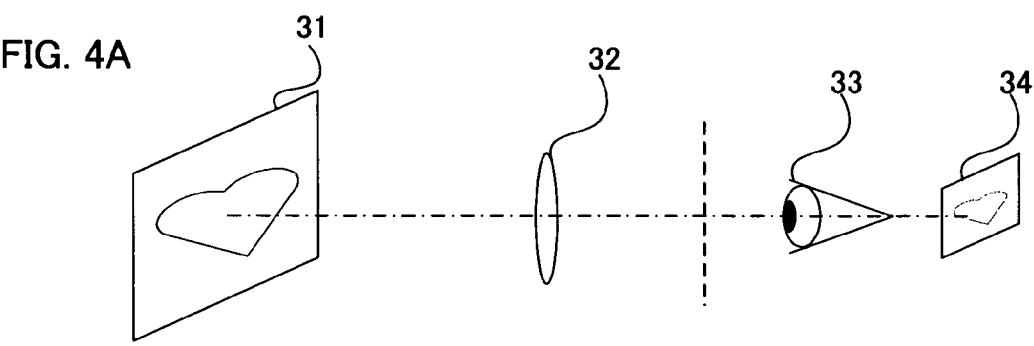
FIGS. 4A to 4B are schematic diagrams for explaining the Fourier transform lens function of a computer generated hologram part in the present invention.
Figure 4B:
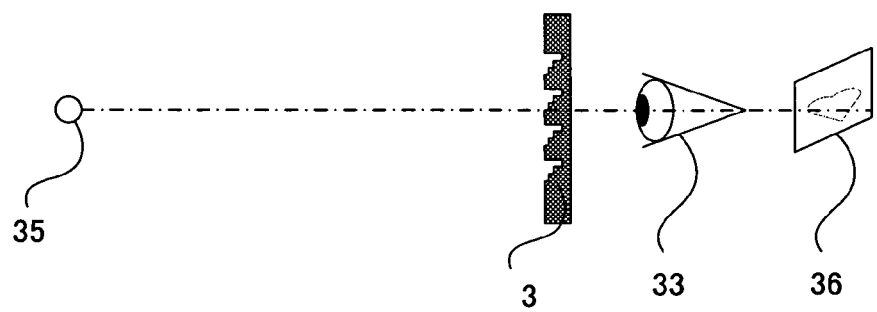

The Fourier transform lens function of the computer generated hologram part of the hologram layer of the present invention will be explained with reference to the drawings. FIGS. 4A to 4B are schematic diagrams for explaining the Fourier transform lens function of the computer generated hologram part. In FIGS. 4A to 4B, FIG. 4A is a schematic diagram for explaining the visual sight, and FIG. 4B is a schematic diagram for explaining the Fourier transform lens function of the computer generated hologram part.

As shown in FIG. 4A, according to the visual sight, by the observation with human eyes 33 via a lens 32 of a desired image 31, an observation image 34 can be observed. On the other hand, in FIG. 4B, according to the visual sight with the human eyes 33 through the computer generated hologram part 3 of the hologram layer of a point light source 35, an optical image 36 according to the concavo-convex shape formed on the surface of the computer generated hologram part 3 can be observed.

For example, if a concavo-convex shape for reproducing a heart image is provided in the computer generated hologram part 3 as shown in FIG. 4B, an optical image 36 of the heart can be observed visually according to the visual observation of the point light source 35 through the computer generated hologram part 3.

As mentioned above, the Fourier transform lens function of the computer generated hologram part in the present invention refers to the function of converting a light incident from a point light source into a desired optical image.

The embodiment of the computer generated hologram part in the present invention is not particularly limited, and it may either be a phase hologram or an amplitude hologram. In the present invention, it is particularly preferable that the computer generated hologram part is a phase hologram. By the use of the phase hologram, a transparent card with a hologram having the further superior design property can be obtained.

The wavelength of the point light source for realizing the function as the Fourier transform lens of the computer generated hologram part in the present invention is not particularly limited, and a desired wavelength can be used as the subject. Moreover, the wavelength of the point light source is not limited to a monochromatic light of one wavelength, and it may be a light including multiple wavelengths, and furthermore, it may be a white light.

As the embodiment of forming the computer generated hologram part in the hologram layer, the embodiment formed only in a part of the hologram layer and the embodiment formed on the entire surface of the hologram layer can be presented. In the present invention, both embodiments can be used preferably. For example, according to the former embodiment, by forming the computer generated hologram part for forming a predetermined optical image at a predetermined position of a transparent card, a transparent card with a hologram having a high card identifying property can be obtained. Moreover, according to the latter embodiment, since an optical image can be obtained from the entire surface of the card, a transparent card with a hologram having the excellent design property can be obtained.

The embodiment in the case with the computer generated hologram part formed only in a part of the hologram layer is not particularly limited, and it may be determined optionally according to the application, or the like of the transparent card with a hologram of the present invention. As the embodiment of such a computer generated hologram part, for example, an embodiment formed in only one point of a predetermined position of the card, or an embodiment formed in a pattern with a certain regularity may be used as well. Moreover, when a magnetic recording part or a printing display part is provided in the transparent card with a hologram of the present invention, it may simply be an embodiment in which the magnetic recording part or the printing display part not superimposed with the computer generated hologram part.

(2) Constituent Material of the Hologram Layer

The material for providing the hologram layer is not particularly limited as long as it can form a minute concavo-convex shape for realizing the Fourier transform lens function, and providing a predetermined refractive index. The refractive index of the material comprising the hologram layer can be determined optionally according to the application, or the like of the transparent card with a hologram of the present invention, and thus it is not particularly limited. Moreover, the wavelength to be the reference of the refractive index is not particularly limited either, and thus it can be selected optionally in a range of 400 nm to 750 nm. In particular, in the present invention, it is preferable that the refractive index at the 633 nm wavelength is in a range of 1.3 to 2.0, and it is particularly preferably in a range of 1.33 to 1.8. Here, the refractive index can be measured with a spectral ellipsometer.

As the material for providing the hologram layer, various kinds of resin materials such as a thermosetting resin, a thermoplastic resin and an ionizing radiation cure resin used conventionally as a material for a relief type hologram forming layer can be used, and thus it is not particularly limited.

As the thermosetting resin, for example, an unsaturated polyester resin, an acrylic modified urethane resin, an epoxy modified acrylic resin, an epoxy modified unsaturated polyester resin, an alkyd resin, a phenol resin, or the like can be presented. Moreover, as the thermoplastic resin, for example, an ester acrylate resin, an amide acrylate resin, a nitro cellulose resin, a polystyrene resin, or the like can be presented.

These resins may be a single polymer or a copolymer made of two or more kinds of constituent components. Moreover, these resins may be used alone or as a combination of two or more kinds. These resins may optionally select and contain various kinds of isocyanate compounds; a metal soap such as a cobalt naphtheate and a zinc naphtheate; an organic peroxide such as a benzoyl peroxide, and a methyl ethyl ketone peroxide; and a heat or ultraviolet ray curing agent such as a benzophenone, an acetophenone, an anthraquinone, a naphthoquinone, an azobis isobutylonitrile, and a diphenyl sulfide.

As the ionizing radiation cure resin, for example, an epoxy modified acrylate resin, an urethane modified acrylate resin, an acrylic modified polyester, or the like can be presented. Among these examples, an urethane modified acrylate resin is particularly preferred, and an urethane modified acrylic based resin represented by the below-mentioned formula is particularly preferable.

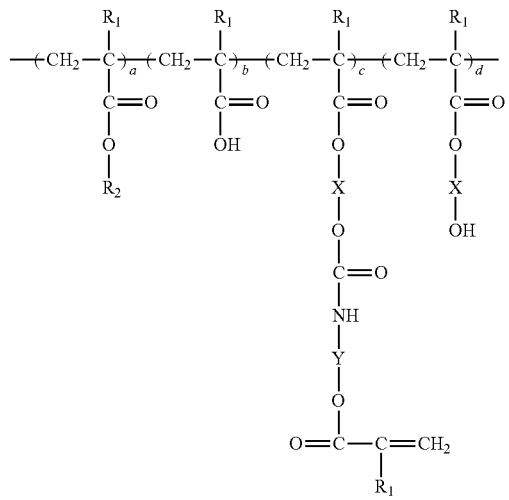

(wherein 5 $R^1$ represent each independently a hydrogen atom or a methyl group, $R^2$ represents a hydrocarbon group having $C_1$ to $C_{16}$, and X and Y respectively represents a straight chain or branched alkylene group. In the case (a+b+c+d) is 100, a is an integer of 20 to 90, b is 0 to 50, c is 10 to 80 and d is 0 to 20.)

The urethane modified acrylic based resin represented by the above-mentioned formula is for example, as a preferable example, an acrylic copolymer obtained by copolymerizing 20 to 90 moles of a methyl methacrylate, 0 to 50 moles of a methacrylic acid and 10 to 80 moles of a 2-hydroxy ethyl methacrylate, and a resin obtained by reacting a hydroxyl group present in the copolymer with a methacryloyloxy ethyl isocyanate (2-isocyanate ethyl methacrylate). Therefore, the methacryloyloxy ethyl isocyanate needs not be reacted with the all hydroxyl groups present in the copolymer, and at least 10 mole % or more, preferably 50 mole % or more of the 2-hydroxy ethyl methacrylate unit in the copolymer may be reacted with the methacryloyloxy ethyl isocyanate. Instead of, or in combination with the 2-hnydroxy ethyl methacrylate, a monomer having a hydroxyl group such as an N-methylol acrylic amide, an N-methylolmethacrylic amide, a2-hydroxy ethyl acrylate, a 2-hydroxy ethyl methacrylate, a 2-hydroxy propyl acrylate, a 2-hydroxy propyl methacrylate, a 4-hydroxy butyl acrylate, and a 4-hydroxy butyl methacrylate can be used as well.

As to the urethane modified acrylic based resin represented by the above-mentioned formula, by dissolving the copolymer by a solvent capable of dissolving the same, such as a toluene, a ketone, a cellosolve acetate and a dimethyl sulfoxide and dropping and reacting with a methacryloyloxy isocyanate while agitating the solution, the isocyanate group is reacted with the hydroxyl group of the acrylic based resin so as to generate an urethane bond so that a methacryloyl group can be introduced into the resin via the urethane bond. The use amount of the methacryloyloxy ethyl isocyanate used at the time is an amount to have an isocyanate group in a range of 0.1 to 5 moles based on 1 mole of a hydroxyl group by the ratio of the hydroxyl group of the acrylic based resin and the isocyanate group, and preferably 0.5 to 3 moles. In the case of using the methacryloyloxy ethyl isocyanate more than equivalent to the hydroxyl group in the above-mentioned resin, the methacryloyloxy ethyl isocyanate may generate a —CONH— $CH_2CH_2$— link by the reaction also with a carboxyl group in the resin.

In the example mentioned above, the all $R^1$ and $R^2$ are a methyl group and X and Y are an ethylene group in the above-mentioned formula, however, the present invention is not limited thereto. The 5 $R^1$ may be each independently a hydrogen atom or a methyl group. Furthermore, as the specific examples of $R^2$, for example, a methyl group, an ethyl group, an n-or iso-propyl group, an n-, iso-or tert-butyl group, a substituted or unsubstituted phenyl group, a substituted or unsubstituted benzyl group, or the like can be presented. As the specific examples of X and Y, an ethylene group, a propylene group, a diethylene group, a dipropylene group, or the like can be presented. The total molecular weight of the urethane modified acrylic based resin obtained accordingly is 10,000 to 200,000 by the standard polystyrene based weight average molecular weight measured by the GPC, and it is further preferably 20,000 to 40,000.

At the time of curing the ionizing radiation cure resin as mentioned above, for the purpose of adjusting the cross linking structure, the viscosity, or the like, together with the monomer, a monofunctional or polyfunctional monomer, an oligomer, or the like as mentioned below can be used in combination.

As the monofunctional monomer, for example, a mono (meth)acrylate such as a tetrahydrofulfuryl (meth)acrylate, a hydroxy ethyl (meth)acrylate, a vinyl pyrrolidone, a (meth) acryloyloxy ethyl succinate, and a (meth)acryloyloxy ethyl phthalate can be presented. As a bifunctional or more monomer, according to the skeleton structure classification, a polyol (meth)acrylate (for example, an epoxy modified polyol (meth)acrylate, a lactone modified polyol (meth)acrylate, or the like), a polyester (meth)acrylate, an epoxy (meth) acrylate, an urethane (meth)acrylate, and additionally, a poly (meth)acrylate having a skeleton of the polybutadiene based, the isocyanuric acid based, the hidantoin based, the melamine based, the phosphoric acid based, the imide based, the phosphazene based, or the like can be presented. Various ultraviolet ray or electron beam curing type monomers, oligomers and polymers can be utilized.

Further specifically, as the bifunctional monomers and oligomers, for example, a polyethylene glycol di(meth)acrylate, a polypropylene glycol di(meth)acrylate, a neopentyl glycol di(meth)acrylate, a 1,6-hexane diol di(meth)acrylate, or the like can be presented. Moreover, as the trifunctional monomers, oligomers and polymers, for example, a trimethylol propane tri(meth)acrylate, a pentaerythritol tri(meth)acrylate, an aliphatic tri(meth)acrylate, or the like can be presented. Moreover, as the tetrafunctional monomers and oligomers, for example, a pentaerythritol tetra(meth)acrylate, a ditrimethylol propane tetra(meth)acrylate, an aliphatic tetra (meth)acrylate, or the like can be presented. Moreover, as the pentafunctional or more monomers and oligomers, for example, a dipentaerythritol penta(meth)acrylate, a dipentaerythritol hexa(meth)acrylate, or the like can be presented, and furthermore, a (meth)acrylate having a polyester skeleton, an urethane skeleton or a phosphazene skeleton, or the like can be presented. Although the functional group number is not particularly limited, if the functional group number is less than 3, the heat resistance tends to be lower, and furthermore, when it is over 20, the flexibility tends to be lowered, and thus those having a 3 to 20 functional group number are particularly preferable.

The use amount of the monofunctional or polyfunctional monomers and oligomers as mentioned above may be determined optionally according to the production method for an image converting layer, or the like. It is in general preferably in a range of 0 part by weight to 50 parts by weight with respect to 100 parts by weight of the ionizing radiation cure resin, and it is particularly preferably in a range of 0.5 part by weight to 20 parts by weight.

Furthermore, as needed, to the hologram layer in the present invention, additives such as a photo polymerization initiating agent, a polymerization inhibiting agent, a deterioration preventing agent, a plasticizing agent, a lubricating agent, a coloring agent such as a dye and a pigment, a filling agent such as an extender pigment and a resin for the amount increase or preventing blocking, a surfactant, an antifoaming agent, a leveling agent, a thixotropic property providing agent, or the like can be added optionally.

(3) Configuration of the Hologram Layer

The hologram layer in the present invention may have a configuration comprising a single layer, or a plural layer structure with the layer having the computer generated hologram part mentioned above (hereinafter, it will be referred to as an image converting layer) and another layer laminated. The above-mentioned other layer when the hologram layer has the plural layer structure is not particularly limited, and a layer having an optional function can be selected and used according to the application, or the like of the transparent card with a hologram of the present invention.

As the plural layer structure, for example, a transparent substrate, an image converting layer, a diffraction function layer and a protection layer laminated in this order can be presented as an example.

Figure 5:
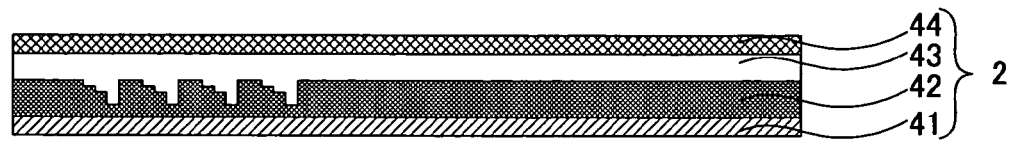
FIG. 5 is a schematic cross sectional view showing an example of a hologram layer in the present invention.

Such a plural layer structure will be explained with reference to FIG. 5. FIG. 5 is a schematic cross sectional view showing an example when the hologram layer in the present invention has the plural layer structure. The hologram layer 2 in the present invention as shown in FIG. 5 may have a plural layer structure with a transparent substrate 41, an image converting layer 42, a diffraction function layer 43 and a protection layer 44 laminated in this order.

According to the plural layer structure, for example when the hologram layer is formed in the uppermost layer of the transparent card with a hologram of the present invention, deterioration of the image forming property of the optical image obtained by the computer generated hologram part due to the adhesion of the pollutant such as water and oil onto the hologram layer can be prevented. Moreover, when the hologram layer is formed as an inner layer of the transparent card with a hologram of the present invention, disturbance of the optical image obtained with the computer generated hologram part due to the influence by the material of the transparent card substrate to be laminated onto the hologram layer, or the like can be prevented.

Since the plural layer structure has the advantages mentioned above, it is preferable that a hologram layer used in the present invention has the plural layer structure. Hereinafter, such a plural layer structure will be explained.

(Transparent Substrate)

The transparent substrate used for the plural layer structure is not particularly limited as long as it has the self supporting property capable of supporting the image converting layer and the light transmitting property capable of transmitting the optical image formed in the computer generated hologram part of the image converting layer. In particular, it is preferable that the transparent substrate in the present invention has an 80% or more transmittance in the visible light region, and more preferably 90% or more. In the case the transmittance is low, the optical image obtained by the transparent card with a hologram of the present invention may be disturbed. Here, the transmittance of the transparent substrate can be measured by the JIS K7361-1 (Determination of the total light transmittance of plastic-transparent materials).

Moreover, as the transparent substrate, those having a lower haze are preferable. Specifically, those having the haze value in a range of 0.01% to 5% are preferable; those in a range of 0.01% to 3% are more preferable; and those in a range of 0.01% to 1.5% are particularly preferable. Here, as the haze value, a value measured based on the JIS K7105 is used.

The material for providing the transparent substrate is not particularly limited as long as it has the above-mentioned characteristics. For example, a plastic resin film and a glass plate can be used. In particular, in the present invention, it is preferable to use a plastic resin film as the transparent substrate because the plastic resin film is lightweight and it has little risk of breakage unlike the case of a glass.

The plastic resin for providing the plastic resin film is not particularly limited as long as it has the rigidity capable of supporting the image converting layer. As such a plastic resin, for example, a polyethylene terephthalate, a polyvinyl chloride, a polyvinylidene chloride, a polyethylene, a polypropylene, a polycarbonate, a cellophane, an acetate, a nylon, a polyvinyl alcohol, a polyamide, a polyamide imide, an ethylene-vinyl alcohol copolymer, a polymethyl methacrylate, a polyether sulfone, a polyether ether ketone, or the like can be presented. In particular, in the present invention, from the viewpoint of the birefringence, it is preferable to use a polycarbonate.

The thickness of the transparent substrate used for the plural layer structure is not particularly limited as long as it is in a range of providing the rigidity capable of supporting the image converting layer according to the application, or the like of the transparent card with a hologram of the present invention. The specific thickness of the transparent substrate can be determined optionally according to the material for providing the transparent substrate. In particular, in the present invention, the thickness of the transparent substrate is preferably in a range of 5 µm to 200 µm, and it is particularly preferably in a range of 10 µm to 50 µm.

(Diffraction Function Layer)

The diffraction function layer used for the plural layer structure has the diffraction function showing a certain refractive index difference with respect to the image converting layer. The refractive index difference of such a diffraction function layer and the image converting layer is not determined optionally, but it is determined in a range capable of converting a light incident from a point light source into a predetermined optical image by the computer generated hologram part according to the constituent material of the diffraction function layer, the constituent material of the image converting layer, or the like. In other words, the refractive index difference between the diffraction function layer and image converting layer is not particularly limited as long as it is in a range capable of converting a light incident from a predetermined point light source into a desired image in the computer generated hologram part.

In the present invention, the refractive index difference between the diffraction function layer and the image converting layer is preferably in a range of $0.75 \times (\lambda_0/D) \times (N-1)/N$ to $1.25 \times (\lambda_0/D) \times (N-1)/N$; it is more preferably in a range of $0.9 \times (\lambda_0/D) \times (N-1)/N$ to $1.1 \times (\lambda_0/D) \times (N-1)/N$; and it is particularly preferably in a range of $0.95 \times (\lambda_0/D) \times (N-1)/N$ to $1.05 \times (\lambda_0/D) \times (N-1)/N$.

Here, the $\lambda_0$ is the reference wavelength and the D represents the maximum depth of the minute concavo-convex shape formed on the surface of the image converting layer. The N represents the number of the steps of the minute concavo-convex shaped formed on the surface of the image converting layer.

The reference wavelength is the representative wavelength of the point light source used for the observation of the optical image obtained by the computer generated hologram part. For example, as the reference wavelength in the case of a white light source, 550 nm can be presented as an example. As to the above-mentioned N, for example, in the example of the computer generated hologram part shown in FIG. 1, since the number of the steps in the minute concavo-convex shape is 4, N=4. Moreover, when the surface is smooth as in the case of a serrated cross section or the like, N=∞.

In particular, in the present invention, the refractive index difference is preferably in a range of 0.3 to 1.0, and it is more preferably in a range of 0.4 to 0.8. Since the refractive index difference between the diffraction function layer and the image converting layer is in the above-mentioned range, for example when the diffraction function layer is made of the air, a bright optical image can be reproduced. Moreover, advantages such as the reduction of an unnecessary diffracted image, or the like may be obtained. Here, the point light source may be a monochrome light such as a laser, and moreover, it may be a white light.

The constituent material for the diffraction function layer is not particularly limited as long as it has a refractive index capable of providing a desired refractive index difference with respect to the image converting layer to be described later. A material of any form of a liquid, a gas and a solid can be adopted. In particular, in the present invention, it is preferable to use a gaseous or solid material.

The above-mentioned gaseous material is not particularly limited as long as it has a refractive index capable of providing a desired refractive index difference with respect to the image converting layer. In particular, in the present invention, it is preferable to use the air as the gaseous material. Since the diffraction function layer is made of the air, the refractive index difference between the image converting layer and the diffraction function layer can be made larger so that the optical image obtained by the transparent card with a hologram of the present invention can be made brighter without a higher order diffracted light, and thus it is advantageous. Moreover, since the depth of the minute concavo-convex shape formed in the surface of the image converting layer can be made shallower, the hologram mastering process and the copying process can be facilitated so that the production method for the transparent card with a hologram of the present invention can be simplified. Furthermore, the refractive index of the diffraction function layer cannot be changed by the time passage, and thus it is advantageous.

The material of the solid material is not particularly limited either as long as it has a refractive index capable of providing a desired refractive index difference with respect to the image converting layer. It can be determined optionally in a range of providing the refractive index difference with respect to the image converting layer at a predetermined value according to the material of the image converting layer and the minute concavo-convex shape of the computer generated hologram part.

The refractive index of the solid material can be determined optionally according to the application, or the like of the transparent card with a hologram of the present invention, and thus it is not particularly limited. Moreover, the wavelength to be the reference of the refractive index is not particularly limited either so that it may be selected optionally in a range of 400 nm to 750 nm. In particular, in the present invention, the refractive index at the 633 nm wavelength is preferably in a range of 1.3 to 2.0, and it is more preferably in a range of 1.33 to 1.8. Since the refractive index of the solid material is in the above-mentioned range, for example, the advantage such as the expansion of the selection width of the constituent material of the diffraction function layer, or the like may be obtained.

The above-mentioned solid material is not particularly limited as long as it has the refractive index mentioned above, or the like and it has the excellent light transmission property. As such a solid material, in general, those having an 80% or more transmittance in the visible light range are preferable, and those of 90% or more are more preferable. In the case the transmittance is low, the optical image obtained by the transparent card with a hologram of the present invention may be disturbed so as to be dark. Here, the above-mentioned transmittance of the solid material can be measured by the JIS K7361-1 (Determination of the total light transmittance of plastic-transparent materials).

Moreover, as the solid material, those having a lower haze are preferable. Specifically, those having the haze value in a range of 0.01% to 5% are preferable; those in a range of 0.01% to 3% are more preferable; and those in a range of 0.01% to 1.5% are particularly preferable. Here, as the above-mentioned haze value, a value measured based on the JIS K7105 is used.

In the present invention, it is preferable to use a plastic resin as the solid material. As the plastic resin, a thermoplastic resin, a thermosetting resin and an ionizing radiation cure resin can be presented as an example. In the present invention, any of these resins can be used preferably.

As the thermoplastic resin used in the present invention, a polyethylene based resin, a polypropylene based resin, an olefin based resin such as a cyclic polyolefin based resin, a fluorine containing resin, a silicone containing resin, or the like can be presented. As the specific examples of such a thermoplastic resin, a poly(methyl)acrylic ester or a partially hydrolyzed product thereof, a polyvinyl acetate or a hydrolyzed product thereof, a polyvinyl alcohol or a partially acetal product thereof, a triacetyl cellulose, a polyisoprene, a polybutadiene, a polychloroplene, a silicone rubber, a polystyrene, a polyvinyl butyral, a polyvinyl chloride, a polyallylate, a chlorinated polyethylene, a chlorinated polypropylene, a poly-N-vinyl carbazole or a derivative thereof, a poly-N-vinyl pyrrolidone or a derivative thereof, a copolymer of a styrene and a maleic anhydride or a half ester thereof, a copolymer having as a polymerization component at least one selected from the monomer groups capable of copolymerization such as an acrylic acid, an ester acrylate, an acrylic amide, an acrylonitrile, an ethylene, a propylene, and a vinyl chloride, a vinyl acetate, or the like can be presented. In the present invention, these thermoplastic resins may be used by only one kind or as a mixture of two or more kinds.

As such a thermosetting resin, a urea resin, a melamine resin, a phenol resin, an epoxy resin, an unsaturated polyester resin, an alkyd resin, an urethane resin, a diallyl phthalate resin, a polyimide resin, an oxetane resin, or the like can be presented.

The above-mentioned active radiation cure resin is not particularly limited either as long as it is a material having the refractive index, or the like. As such an active radiation cure resin, a photo setting type resin to be hardened by the light irradiation, an electron beam curing type resin to be hardened by the electron beam radiation, or the like can be presented. In the present invention, it is preferable to use a photo setting type resin. Since the photo setting type resin is widely utilized also in the other fields as an already established technique, it can be applied to the present invention.

Moreover, as the photo setting type resin, a photo setting type resin to be hardened by an ultraviolet ray or a visible light can be presented. In particular, it is preferable to use an ultraviolet cure resin to be hardened by the irradiation of a light of a 150 to 500 nm wavelength; more preferably of 250 to 450 nm; and further preferably of 300 to 400 nm. It is useful to use the ultraviolet cure resin from the viewpoint of the convenience of the light irradiation apparatus, or the like.

As the specific examples of the ultraviolet cure resin used in the present invention, those produced by modifying an (un)saturated polyester resin, an epoxy resin, an urethane resin, an acrylic resin, or the like with an acid containing monomer such as a (meth)acrylic acid or a glycidyl group containing monomer such as a glycidyl (meth)acrylate and a (meth)allyl glycidyl ether, a mixture of at least one kind of a modified polyester resin having 300 to 5,000 number average molecular weight, a modified epoxy resin, a modified urethane resin, a modified acrylic resin, or the like produced by modifying a hydroxyl group containing (meth)acrylic monomer such as a 2-hydroxy ethyl (meth)acrylate, a glyceril di(meth)acrylate, a trimethylol propane di(meth)acrylate, and a pentaerythritol tri(meth)acrylate with a polyfunctional isocyanate monomer such as a hexamethylene diisocyanate, a xylilene diisocyanate, a toluene diisocyanate, or the like can be presented. Moreover, as needed, a monomer of a (meth)acrylate such as an ethylene glycol mono(meth)acrylate, an ethylene glycol di(meth)acrylate, a 1,6-hexane diol mono (meth)acrylate, a 1,6-hexane diol di(meth)acrylate, a trimethylol propane di(meth)acrylate, a trimethylol propane tri (meth)acrylate, a pentaerythritol tri(meth)acrylate, a pentaerythritol tetra(meth)acrylate, a dipentaerythritol penta (meth)acrylate, and a dipentaerythritol hexa(meth)acrylate, a fluorine containing monomer, a silicon containing monomer, a sulfur containing monomer, a monomer having a fluolene skeleton, or the like may be added thereto.

In the case the diffraction function layer in the present invention is made of the solid material mentioned above, the diffraction function layer may contain a compound other than the solid material. Such a compound is not particularly limited, and it may be selected and used optionally according to the application, or the like of the transparent card with a hologram of the present invention. As an example of the above-mentioned other compound used in the present invention, an ultraviolet absorber, a coloring agent, or the like can be presented.

The above-mentioned ultraviolet absorber is not particularly limited as long as it is a compound capable of providing a desired ultraviolet ray absorbing property to the diffraction function layer in the present invention. As the ultraviolet absorber used in the present invention, for example, a benzotriazol based ultraviolet absorber such as a 2-(2H-benzotriazol-2-yl)-p-cresol, a 2-(2H-benzotriazol-2-yl)-4-(1,1,3,3-tetramethylbutyl)phenol, a 2-(2H-benzotriazol-2-yl)-4-6-bis(1-methyl-1-phenyl ethyl) phenol, a 2-[5-chloro(2H)-benzotriazol-2-yl]-4-methyl-6-(tert-butyl) phenol, a 2,4-di-tert-butyl-6-(5-chlorobenzotriazol-2-yl) phenol, and a 2-(2H-benzotriazol-2-yl)-4,6-di-tert-pentyl phenol; a triadine based ultraviolet absorber such as a 2-(4,6-diphenyl-1,3,5-triadine-2-yl)-5-[(hexyl)oxy]-phenol; a benzophenone based ultraviolet absorber such as an octabenzone; a benzoate based ultraviolet absorber such as a 2,4-di-tert-butylphenyl-3,5-di-tert-butyl-4-hydroxy benzoate; a liquid ultraviolet absorber such as a 2-(2H-benzotriazol-2-yl)-6-(straight chain and side chain dodecyl)-4-methyl phenol; a polymer type ultraviolet absorber such as a 2-hydroxy-4-(methacryloyloxy ethoxy benzophenone/methyl methacrylate copolymer; and additionally, an anion based water soluble polymer ultraviolet absorber, a cation based water soluble polymer ultraviolet absorber, a nonion based water soluble polymer ultraviolet absorber, or the like can be presented.

The above-mentioned coloring agent is not particularly limited as long as it is a compound capable of providing a light absorbing property of a desired wavelength to the diffraction function layer in the present invention. As the coloring agent used in the present invention, for example, a pigment such as an azo based pigment, a bound azo based pigment, an isoindolinone based pigment, a quinacridone based pigment, a diketopyrolopyrol based pigment, an anthraquinone based pigment and a dioxazine based pigment, and a dye such as a 1,1 chromium complex based dye, a 1,2 chromium complex based dye, a 1,2 cobalt complex based dye, an anthraquinone based dye, a phthalocyanine based dye, a methine based dye, a lactone based dye, and a thioindigo based dye can be presented.

Moreover, to the diffraction function layer in the present invention, in addition to the above-mentioned additives, fine particles may be added for the purpose of adjusting the refractive index of the diffraction function layer. The refractive index of the fine particles to be added to the diffraction function layer can be determined optionally according to the refractive index required for the diffraction function layer, and in general it is preferably higher than the refractive index of the solid material for forming the diffraction function layer. Since such fine particles are used, the diffraction function layer may have a high refractive index. In particular, in the present invention, fine particles having the refractive index at a light having a 400 to 750 nm wavelength of the fine particles of 1.50 or more are preferable; moreover, fine particles having the refractive index of 1.70 or more; and furthermore, fine particles of 1.90 or more are further preferable.

Here, the refractive index at a light having a 400 to 750 nm wavelength is 1.50 or more denotes that the average refractive index at a light having a wavelength of the above-mentioned range is 1.50 or more so that the refractive index at the all lights having the wavelengths of the above-mentioned range needs not be 1.50 or more. Moreover, the average refractive index is a value obtained by dividing the total sum of the refractive index measurement values for each light having a wavelength in the above-mentioned range by the number of the measurement points.

As the fine particles having a high refractive index, for example, inorganic fine particles such as inorganic oxide fine particles, and organic fine particles, or the like can be presented. In particular, for the high transparency and the light transmitting property, the inorganic oxide fine particles are preferable. Since the inorganic oxide is colorless or barely colored, those having a high refractive index are suitable as a component for providing a high refractive index. As a light transmissible inorganic oxide having a high refractive index, a titanium oxide ($TiO_2$), a zinc oxide (ZnO), a zirconium oxide ($ZrO_2$), an indium/tin oxide (ITO), an antimony/tin oxide (ATO), or the like can be presented. As the titanium oxide, in particular, those of the rutile type having a high refractive index are preferable.

In order not to lower the transparency of the diffraction function layer, the primary particle size of the fine particles is preferably about 10 to 350 nm, and in particular, it is preferably about 10 to 100 nm. If the primary particle size is larger than the above-mentioned range, the transparency of the diffraction function layer may be deteriorated. Moreover, if the primary particle size is smaller than the above-mentioned range, aggregation can be generated easily so that even dispersion in the diffraction function layer may be difficult. Here, the primary particle size of the fine particles may be measured visually by the scanning type electron microscope (SEM), or the like, or it may be measured mechanically by a particle size distribution meter utilizing the dynamic light scattering method or the static light scattering method, or the like. Moreover, as long as the primary particle size of the fine particle is in the above-mentioned range, the particle shape may either be spherical or needle-like, or any other shape.

In the present invention, when the diffraction function layer is made of the solid material, the diffraction function layer in the present invention may be made of the same resin as the protection layer to be described later and integrally therewith. Since the diffraction function layer and the protection layer to be described later are formed integrally with the same resin, a hologram layer having the further excellent rigidity can be formed.

The diffraction function layer in the present invention has the diffraction function showing a certain refractive index with respect to the image converting layer. For providing such a diffraction function by the diffraction function layer, the diffraction function layer may be present on the image converting layer, and the thickness thereof is not particularly limited. Since the diffraction function layer is present on the image converting layer, a certain refractive index difference can be provided. However, in consideration to the production suitability, or the like, of the transparent card with a hologram of the present invention, the thickness of the diffraction function layer is preferably in a range of 0.5 μm to 50 μm, and it is particularly preferably in a range of 1 μm to 25 μm.

(Protection Layer)

Next, the protection layer used for the plural layer structure will be explained. It is preferable that the protection layer has the excellent light transmittance. In particular, the protection layer in the present invention preferably has an 80% or more transmittance in the visible light range, and more preferably 90% or more. If the transmittance is low, the optical image obtained by the transparent card with a hologram of the present invention may be disturbed. Here, the transmittance of the protection layer can be measured by the JIS K7361-1 (Determination of the total light transmittance of plastic-transparent materials).

Moreover, as the protection layer, those having a lower haze are preferable. Specifically, those having the haze value in a range of 0.01% to 5% are preferable; those in a range of 0.01% to 3% are more preferable; and those in a range of 0.01% to 1.5% are particularly preferable. Here, as the above-mentioned haze value, a value measured based on the JIS K7105 is used.

Furthermore, it is preferable that the protection layer has the excellent surface smoothness. If the surface of the protection layer is rough, a light incident from a point light source can be scattered by the protection layer so that the optical image obtained by the transparent card with a hologram of the present invention may be disturbed.

The material for providing the protection layer is not particularly limited as long as it has the above-mentioned characteristics. As such a material, either a rigid material without the flexibility such as a glass or a flexible material having the flexibility can be used, however, it is preferable to use a flexible material in the present invention. Since the flexible material is used, for example, the production process for a transparent card with a hologram of the present invention can be the roll to roll process so that the transparent card with a hologram of the present invention can be provided with the excellent productivity.

Since the flexible material is same as those mentioned in the item of the above-mentioned "(Transparent substrate)", the explanation thereof is not repeated here.

The protection layer in the present invention may contain an additive within a range not to deteriorate the purpose of the present invention. The above-mentioned additive is not particularly limited, and thus it can be selected optionally according to the application, or the like of the transparent card with a hologram of the present invention. Since the additive is same as those mentioned in the above-mentioned item of "(2) Constituent material of the hologram layer" as the other compound, the explanation thereof is not repeated here.

The thickness of the protection layer in the present invention is not particularly limited as long as it is in a range of providing a rigidity to the extent not to break the minute concavo-convex shape formed in the surface of the image converting layer by the protection layer with the deformation derived from the external factors. The thickness may be determined optionally according to the kind of the constituent material of the protection layer, and it is in general preferably in a range of 0.5 μm to 10 mm, and it is particularly preferably in a range of 1 μm to 5 mm.

Moreover, as mentioned above, when the diffraction function layer is made of a solid material, the protection layer of the present invention may be provided integrally with the same resin as the material of the diffraction function layer. Accordingly, since the protection layer in the present invention is provided integrally with the same resin as the diffraction function layer, the hologram element used in the present invention can have the excellent rigidity.

(Others)

As to the plural layer structure, although it is preferable that the image converting layer has the configuration with the transparent substrate, the diffraction function layer and the protection layer laminated as mentioned above, depending on the position with the hologram layer formed, or the like in the transparent card with a hologram of the present invention, the protection layer may not be formed. Moreover, depending on the production method for a transparent card with a hologram of the present invention, or the like, the transparent substrate may not be laminated.

(4) Others

The thickness of the hologram layer of the present invention is not particularly limited as long as it is within a range capable of producing the minute concavo-convex shape comprising the computer generated hologram part. It is in general in a range of 2 μm to 500 μm, and it is more preferably set in a range of 5 μm to 400 μm.

The position for forming the hologram layer in the transparent card with a hologram of the present invention can be determined optionally according to the application, or the like of the transparent card with a hologram of the present invention. As the above-mentioned position for forming the hologram layer, an embodiment formed in the uppermost layer of the transparent card with a hologram of the present invention and an embodiment having the configuration with the transparent card substrate to be described later laminated on the both sides of the hologram layer can be presented. In the present invention, either embodiment can be used preferably. For example, according to the former embodiment, since the transparent card substrate and the hologram layer can be laminated easily, the transparent card with a hologram of the present invention can be provided with the excellent productivity. Moreover, according to the latter embodiment, disturbance of the optical image obtained by the computer generated hologram part due to the adhesion of the pollutant such as water and oil onto the computer generated hologram part of the hologram layer can be prevented. Moreover, according to the latter embodiment, since the hologram layer is provided inside the transparent card, copying of the computer generated hologram part can be prevented so as to obtain a transparent card with a hologram having the excellent security property.

In the transparent card with a hologram of the present invention, the hologram layer may be formed by only one layer, or by two or more layers.

2. Transparent Card Substrate

Next, the transparent card substrate used for the transparent card with a hologram of the present invention will be explained. The transparent card substrate used in the present invention is made of a resin transparent with respect to a visible light. Moreover, the transparent card substrate used in the present invention also has the function of providing the self supporting property to the transparent card with a hologram of the present invention. Hereinafter, such a transparent card substrate will be explained.

(1) Resin

The resin for providing the transparent card substrate is not particularly limited as long as it is a resin transparent with respect to a visible light. Here, "transparent with respect to a visible light" in the present invention denotes transmission of a light in the visible light range, and more specifically, 50% or more light transmittance of a light of a 400 nm to 700 nm wavelength. In particular, in the present invention, the above-mentioned transmittance is preferably 80% or more, and it is more preferably 90% or more.

The resin used for the transparent card substrate is not particularly limited as long as it has the transparency with respect to a visible light as mentioned above. As such a resin, a thermoplastic resin, a thermosetting resin, and an active radiation cure resin can be presented. Moreover, as the active radiation cure resin, an electron beam curing resin, an ultra-violet ray curing resin, or the like can be presented. In the present invention, any of the above-mentioned resins can be used preferably.

As the specific examples of the above-mentioned resin used in the present invention, a polyethylene, a polypropylene, a polystyrene, a polyester, a polyvinyl chloride, a polyvinyl acetate, a methacrylic resin, a polycarbonate, an acrylic resin, a cycloolefin resin, an acrylic styrene resin, or the like can be presented. In the present invention, among these resins, it is preferable to use a polyester, a polyvinyl chloride or a polycarbonate.

(2) Other Compounds

The above-mentioned transparent card substrate used in the present invention may contain an additive other than the above-mentioned resins. As such an additive, for example, a stabilizing agent, a reinforcing agent, a plasticizing agent, a wavelength converting material, an infrared absorber, an ultraviolet absorber, a coloring agent such as a pigment and a dye can be presented. In particular, in the present invention, it is preferable that the transparent card substrate contains an infrared absorber.

The reason why it is preferable that the transparent card substrate contains an infrared absorber is as follows. For example, the existing card recognizing apparatus using an opaque plastic card represented by the bank ATM, or the like comprise a mechanism for recognizing the existence of a card, utilizing the non transmission of an infrared ray by the plastic card. According to such a card recognizing apparatus, a transparent card allowing the transmission of the infrared ray may not be used. Therefore, since the transparent card substrate contains an infrared absorber so as to provide the infrared ray blocking ability without deteriorating the visible light transparency to the transparent card with a hologram of the present invention, the transparent card with a hologram of the present invention can be used also for the existing card recognizing apparatuses.

As the infrared absorber, a compound having the maximum absorbing wavelength at the 800 nm to 1,000 nm wavelength can be used preferably. As such an infrared absorber, for example, a metal oxide such as an iron oxide, a cerium oxide, a tin oxide and an antimony oxide, an organic infrared absorber such as an indium-tin oxide, a tungsten hexachloride, a tin chloride, a cupric sulfide, a chromium-cobalt complex salt, a thiol-nickel complex, an aminium compound, a diimonium compound and a phthalocyanine compound, or the like can be presented.

The addition amount in the case of adding the infrared absorber to the transparent card substrate is not particularly limited as long as it is within a range capable of providing a desired infrared ray absorbing property to the transparent card according to the application, or the like of the transparent card with a hologram of the present invention, and thus it can be prepared optionally according to the light absorbing coefficient of the infrared absorber to be added. In general, the addition amount of the infrared absorber in the present invention is in a range of 0.1% by mass to 50% by mass in the transparent card substrate, in particular, it is in a range of 1% by mass to 20% by mass.

(3) Others

The transparent card substrate used for the transparent card with a hologram of the present invention may be used by only one sheet or by a plurality of sheets, however, it is preferable to use by a plurality of sheets. Since the transparent card substrate is used by a plurality of sheets, for example by laminating the transparent card substrates having different functions, the transparent card substrate of the present invention can be provided with a high function.

Accordingly, as the embodiments of using a plurality of the transparent card substrates, an embodiment with the transparent card substrates having different thicknesses laminated, an embodiment with the transparent card substrates having different constituent materials laminated, furthermore, an embodiment with the transparent card substrates having different design properties laminated, or the like can be presented.

In the present invention, when the transparent card substrate is used by a plurality of sheets, it is preferable to use two or more kinds of the transparent card substrates having different thicknesses. In particular, in the present invention, it is preferable to laminate a relatively thick core sheet for providing the self supporting property to the transparent card with a hologram of the present invention and a relatively thin over sheet for providing a desired function to the transparent card with a hologram of the present invention. Accordingly, since the transparent card substrate is roughly divided into the core sheet and the over sheet with different functions, the transparent card with a hologram of the present invention can be provided with a high function and the excellent productivity.

The thickness of the over sheet is not particularly limited, and it can be adjusted optionally according to the function to be provided to the over sheet. In the present invention, it is preferable that the thickness of the over sheet is in a range of 30 μm to 500 μm, and it is particularly preferably in a range of 50 μm to 150 μm. Since the thickness of the over sheet is in the above-mentioned range, for example at the time of applying the printing process to the over sheet, the printing operation and the like can be facilitated, and thus it is advantageous.

The above-mentioned over sheet may have a desired function according to the application of the transparent card with a hologram of the present invention. For example, by providing a printing to the over sheet, the design property of the transparent card with a hologram of the present invention can be improved, and furthermore, by applying a magnetic tape, the information recording function can be provided.

The thickness of the core sheet is not particularly limited as long as it is in a range capable of providing a desired self supporting property to the transparent card with a hologram of the present invention. It is in general preferably in a range of 100 μm to 500 μm, and it is particularly preferably in a range of 200 μm to 300 μm.

The above-mentioned core sheet used in the present invention may be used not only by one sheet but also in a state with a plurality of sheets laminated.

The embodiment of using the over sheet and the core sheet as the transparent card substrate is not particularly limited. For example, the above-mentioned embodiment shown in FIG. 2 and the embodiment shown in FIGS. 3A to 3B can be presented.

Moreover, the over sheet comprising the card may be a sheet including the computer generated hologram part.

3. Transparent Card with a Hologram

The transparent card with a hologram of the present invention may have a configuration other than the hologram layer and transparent card substrate. As the other configuration, a heat seal layer made of a thermoplastic resin can be presented. In the present invention, for improving the adhesion property between the hologram layer and the transparent card substrate, it is preferable to bond the hologram layer and the transparent card substrate via a heat seal layer.

The thermoplastic resin used for the heat seal layer is not particularly limited as long as it can bond the hologram layer and the transparent card substrate with a desired bonding strength and it is a resin transparent with respect to a visible light. As such a thermoplastic resin, for example, a vinyl chloride/vinyl acetate copolymer, an ethylene/vinyl acetate copolymer, a vinyl chloride/propionic acid copolymer, a rubber based resin, a cyano acrylate resin, a cellulose based resin, an ionomer resin and a polyolefin based copolymer can be presented.

Moreover, the thickness of the heat seal layer is not particularly limited as long as it is in a range capable of bonding the hologram layer and the transparent card substrate. It is in general in a range of 0.5 μm to 10 μm, and it is set more preferably in a range of 1 μm to 5 μm.

Moreover, other than the heat seal layer, the heat seal layer may contain a plasticizing agent, a stabilizing agent, a hardening agent, or the like as needed.

Moreover, the transparent card with a hologram of the present invention may comprise another layer such as an anti-reflection layer and a hard coat layer, or a recording member such as a magnetic recording part and an IC chip.

Furthermore, the transparent card substrate with a hologram of the present invention may have printing applied. Particularly when a high design property is required to the transparent card with a hologram of the present invention, it is preferably to apply printing.

The embodiment for applying printing on the transparent card with a hologram of the present invention is not particularly limited as long as it is not an embodiment of completely blocking the light to the computer generated hologram part of the hologram layer. Therefore, printing may be applied in an embodiment with the light partially blocked with respect to the computer generated hologram part.

The layer for applying the printing is not particularly limited as long as it is a layer that printing information is observed visually from its out side, and thus the layer providing the uppermost layer may be printed, or a layer providing the inner layer may be printed. Moreover, the layer to be printed is not particularly limited, and thus the hologram layer may be printed, or the transparent card substrate may be printed. Furthermore, when the transparent card substrate comprises the core sheet and the over sheet, both the over sheet and core sheet may be printed, or only either one may be printed.

The printing method at the time of applying the printing is not particularly limited as long as it is a method capable of providing a desired design property. For example, a basic printing method such as planographic printing, intaglio printing, letterpress printing and screen printing, and an applied printing method thereof can be used. As the applied printing method, flexo printing, resin letterpress printing, gravure offset printing, pad printing, ink jet printing, transfer printing using a transfer foil, transfer printing using a thermally fusible or sublimation type ink ribbon, electrostatic printing, or the like can be used. Moreover, as to the technique, ultraviolet ray (UV) curing printing of curing an ink with an ultraviolet ray, baking printing of curing an ink at a high temperature, waterless offset printing not using dampening water, or the like can be used.

Moreover, the printing information to be provided by printing is not particularly limited. For example, letters, signs, marks, illustrations, characters, company names, product names, sales points, handling explanations, or the like can be presented.

The size of the transparent card with a hologram of the present invention is not particularly limited. It may be 85.60 mm by the longer side, 53.98 mm by the shorter side and 0.76 mm by the thickness based on the ISO (International Organization for Standardization) 7810, or it may be of another size. Moreover, as the shape of the transparent card with a hologram of the present invention, any shape such as round, rectangular and trapezoidal can be adopted.

As the application for the transparent card with a hologram of the present invention, for example, a credit card, a cash card, a point card, various kinds of ID cards, or the like can be presented.

4. Production Method for the Transparent Card with a Hologram

Next, the production method of the present invention will be explained. The production method for a transparent card with a hologram of the present invention is not particularly limited as long as it is a method capable of producing the transparent card with a hologram having the above-mentioned configuration. By laminating the hologram layer and the transparent card substrate, or the like by combining commonly known methods, it can be produced.

The method for producing the hologram layer is not particularly limited as long as it is a method capable of forming the computer generated hologram part having a predetermined concavo-convex shape on the surface so that it can be formed in general by a method of producing a hologram master with a concavo-convex shape to be provided onto the computer generated hologram part and transferring a concavo-convex shape to a hologram layer using the hologram master.

As to the production method for the hologram master, for example, after determining an optical image to be obtained by the computer generated hologram part, data of the optical image are produced; the Fourier transform data are calculated from the position of the Fourier transform surface, or the like; and the Fourier transform data are converted to rectangular data for the electron beam drawing. Then, by the method of drawing the minute concavo-convex shape onto a resist surface coated on a glass plate by an electron beam lithography system for drawing the rectangular data onto a semiconductor circuit mask, or the like, it can be produced.

As the method for forming a hologram layer having a computer generated hologram part using the hologram master produced by the above-mentioned method, the known 2P method, injection molding method, sol gel process, hard emboss, soft emboss, semi dry emboss, various kinds of nano imprint method, or the like can be used. In particular, in the present invention, it is preferable to use the 2P method. According to the 2P method, simultaneously with the formation of the image converting layer on the substrate, the concavo-convex shape can be formed on the surface of the image converting layer.

The production method for the transparent substrate card is not particularly limited as long as it is a method capable of forming a transparent card substrate of a desired shape, and thus a common production method for a plastic card can be used.

The method for laminating the hologram layer and the transparent card substrate is not particularly limited as long as it is a method capable of bonding both by a desired bonding strength. For example, both can be adhered by the fusion adhesion with a dry film made of a thermoplastic resin disposed between the hologram layer and the transparent card substrate.

B. Apparatus for Recognizing a Transparent Card with a Hologram

Next, the apparatus for recognizing a transparent card with a hologram of the present invention will be explained. The apparatus for recognizing a transparent card with a hologram of the present invention comprises a point light source; a supporting part for supporting a transparent card with a hologram such that a light from the point light source is incident on the transparent card with a hologram; and a light receiving part for receiving the light transmitted the transparent card with a hologram supported by the supporting part.

According to the present invention, since the optical image formed by the transparent card with a hologram can be recognized by the transmitted light from the point light source, an apparatus for recognizing a transparent card with a hologram with little card identifying property decline can be obtained for example, even when the transparent card with a hologram is deformed or inclined. Moreover, according to the present invention, since the optical image can be recognized by the transmitted light from the point light source without the need of a complicated optical system, a simple apparatus for recognizing a transparent card with a hologram can be obtained.

Figure 6A:
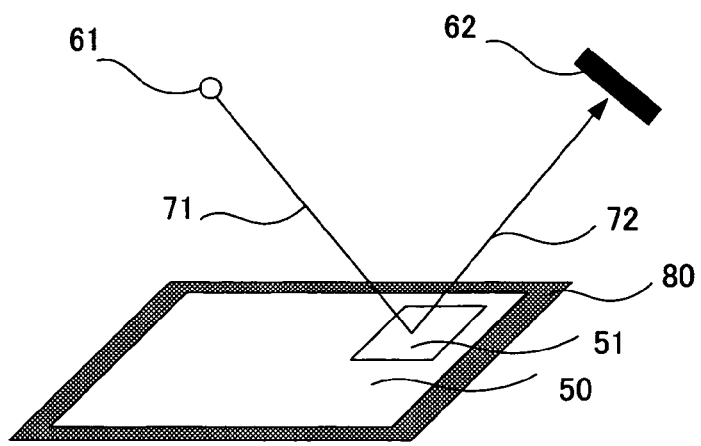
FIGS. 6A to 6B are schematic diagrams for explaining the identifying mechanism for a card with a reflection type hologram.
Figure 6B:
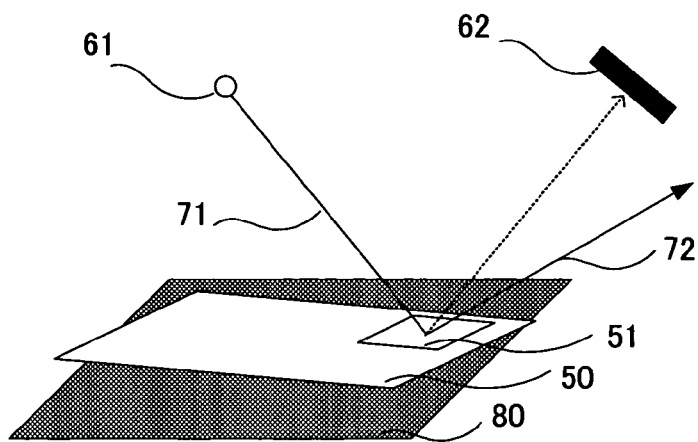

The reason why the apparatus for recognizing a transparent card with a hologram of the present invention has the above-mentioned advantages will be explained with reference to FIGS. 6A to 6B and 7A to 7B. FIGS. 6A to 6B are schematic diagrams showing an example of a card recognizing mechanism of the conventional card with a reflection type hologram recognizing apparatus. As shown in FIG. 6A, when a reflection type hologram 51 is applied to a card 50 supported on a supporting part 80, for recognizing the optical image recorded in the reflection type hologram 51, an incident light 71 is directed to the reflection type hologram 51 by a predetermined angle from a light source 61 so that a reflected light 72 reflected by the reflection type hologram 51 is received by a light receiving part 62. In this case, the positions of the light source 61 and the light receiving part 62 are fixed at a predetermined position according to the incident angle of the incident light 71. Therefore, for example when the card 50 is inclined as shown in FIG. 6B, the reflection angle of the reflected light 72 reflected by the reflection type hologram 51 is changed so that the reflected light 72 cannot be received by the light receiving part 62, and thus the optical image cannot be recognized.

Figure 7A:
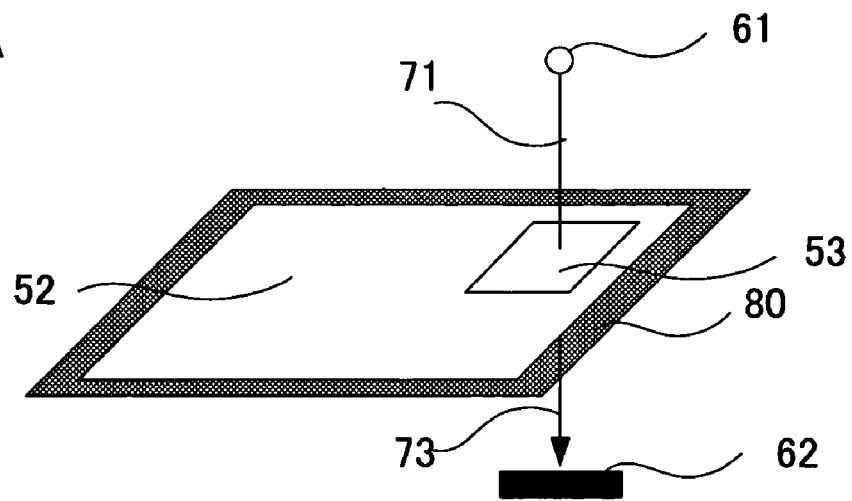
FIGS. 7A to 7B are schematic diagrams for explaining the card identifying system of the present invention.

On the other hand, according to the apparatus for recognizing a transparent card with a hologram of the present invention, as shown in FIG. 7A, an incident light 71 from a light source 61 transmits the hologram part 53 of the transparent card with a hologram 52 supported on the supporting part 80 so that the transmitted light 73 is received by the light receiving part 62, and thus the optical image can be recognized. Therefore, even when the transparent card with a hologram 52 is inclined as shown in FIG. 7B, the optical path of the transmitted light 73 cannot be changed.

According to the present invention, an apparatus for recognizing a transparent card with a hologram system with little decline of the optical image identifying property can be obtained even when the transparent card with a hologram is deformed, or the like, and thus it is advantageous.

Figure 7B:
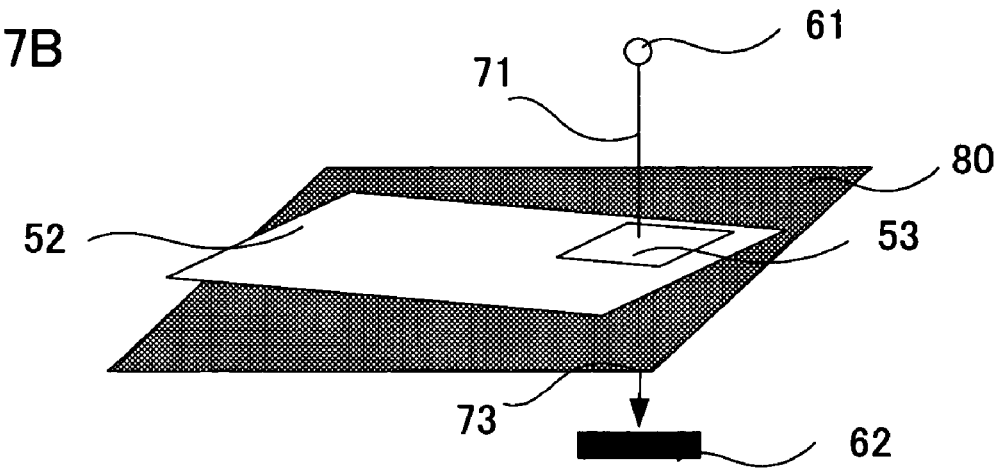

Moreover, as shown in FIGS. 7A to 7B, in the case of identifying the optical image by the transmitted light 73, as the optical system necessary for the hologram recognizing apparatus, it is sufficient that a light from the light source 61 is incident on the light receiving part 62 without the need of considering the incident angle of the incident light, or the like for identifying the optical image.

According to the present invention, a simple apparatus for recognizing a transparent card with a hologram can be obtained, and thus it is advantageous.

The transparent card with a hologram of the present invention comprises a point light source, a supporting part and a light receiving part. Hereinafter, each configuration will be explained in detail.

The wavelength of the point light source used in the present invention is not particularly limited as long as it is in a range capable of obtaining a predetermined optical image from the hologram according to the form of the hologram of the transparent card with a hologram to be recognized using the apparatus for recognizing a transparent card with a hologram of the present invention. As such a wavelength of the light source, any one can be used regardless of the infrared ray wavelength region, the visible light wavelength region and the ultraviolet ray wavelength region. Moreover, the point light source may either be a white light or a monochrome light. In particular, in the present invention, from the viewpoint of the convenience, it is preferable to use a monochrome light or a white light. As to the monochrome light, a wavelength in a range of 100 nm to 2,000 nm is preferable, and it is particularly preferably in a range of 400 nm to 1,600 nm.

The kind of the light source of the wavelength range is not particularly limited. For example, a semiconductor laser, a light emitting diode, or the like can be used.

The supporting part used in the present invention supports the transparent card with a hologram and it is disposed such that a light from the point light source is incident on the transparent card with a hologram. The form of the supporting part is not particularly limited as long as it can support the transparent card with a hologram, and thus a common one can be used.

In the apparatus for recognizing a transparent card with a hologram of the present invention, the position for disposing the supporting part is not particularly limited as long as the light from the point light source is incident on the hologram of the transparent card with a hologram supported on the supporting part. As to the embodiment of having a light from the point light source incident on the transparent card with a hologram, it may either be an embodiment of directly incident from the point light source, or an embodiment of incident on the transparent card with a hologram after having a light from the point light source transmitted through a reflecting mirror or a lens.

The light receiving part used in the present invention receives a light transmitted the transparent card with a hologram. The light receiving part is not particularly limited as long as it can recognize an optical image obtained by the transparent card with a hologram, and thus a common one can be used. As the light receiving part used in the present invention, for example, an image pick up element such as a CCD and one having a light receiving element such as a photoelectronic sensor, or the like can be presented.

The embodiment of receiving a light transmitted the transparent card with a hologram by the light receiving part is not particularly limited. It may either be an embodiment of directly receiving a light transmitted the transparent card with a hologram or an embodiment of receiving a light transmitted the transparent card with a hologram after transmitting a reflecting mirror or a lens.

Moreover, it is preferable that the light receiving part is connected with an optical image identifying apparatus for recognizing the shape of the received optical image, or the like. Since the light receiving part is connected with the optical image identifying apparatus, the apparatus for recognizing a transparent card with a hologram of the present invention can be utilized for a card identifying system.

The apparatus for recognizing a transparent card with a hologram of the present invention can be used preferably for recognizing an optical image obtained from the computer generated hologram part of the transparent card with a hologram explained in the above-mentioned item of "A. Transparent card with a hologram".

Moreover, the optical image recognized by the apparatus for recognizing a transparent card with a hologram of the present invention is not limited to one kind and thus it may recognize a plurality of optical images. In the case of recognizing a plurality of optical images, the optical images obtained from the hologram parts provided at a plurality of positions of the transparent card with a hologram may be recognized at the same time, or a plurality of optical images may be recognized successively according to a predetermined rule.

As to the application of the apparatus for recognizing a transparent card with a hologram of the present invention, it is used for the application of the person authentication, and the authenticity confirmation. For example, while being assembled in an ATM apparatus, it can be used as an authenticity judging method for the card itself. Moreover, it can also be used for the entrance and exit system, administration of the documents to have the access limit, or the like, and the system of confirming whether or not the person to handle the delivery and receipt of goods is authorized.

The present invention is not limited to the above-mentioned embodiments. The above-mentioned embodiments are examples, and thus any case having the substantially same configuration as the technological idea disclosed in the claims of the present invention with the same effects is incorporated in the technological scope of the present invention.

EXAMPLES

1. Example 1

(1) Production of the Hologram Layer

A resist layer was formed by rotation coating of a resist for dry etching with a spinner onto the chromium thin film of a photo mask blank plate with a surface low reflection chromium thin film laminated onto a synthetic quartz substrate. As the resist for dry etching, ZEP 7000 produced by ZEON CORPORATION was used, and the thickness of the resist layer was 400 nm. With an electron beam lithography system (MEBES 4500: produced by Etec Systems, Inc.), a pattern preliminarily formed with a computer was exposed on the resist layer formed accordingly. After sectioning and forming an easily soluble portion with the resist resin hardened by the exposure and an unexposed portion, the solvent development was carried out by the spray development of spraying a developing solution, or the like so as to remove the easily soluble portion for forming a resist pattern.

By utilizing the resist pattern formed by the above-mentioned method, the chromium thin film in a portion not covered with the resist was removed by dry etching so as to expose the quartz substrate of the lower layer in the removed portion. Then, by etching the exposed quartz substrate, a concave portion generated according to the procedure of the etching and the projecting portion comprising the quartz substrate original portion covered with the chromium thin film and the resist thin film successively from below were formed. Furthermore, by dissolving and removing the resist thin film, a quartz substrate having a concave portion generated by etching the quartz substrate and the projecting portion having a portion with the chromium thin film laminated at the top part was obtained.

To the concavo-convex shape hologram master produced as mentioned above, an image converting layer forming composition (UV curing acrylate resin: refractive index 1.52, measurement wavelength 633 nm) was dropped. A polycarbonate substrate was placed thereon, and pressured. Then, by directing an active radiation (using a H valve produced by Fusion UV Systems Japan KK., irradiation amount 500 mJ), the image converting layer forming composition was peeled off after curing so as to produce a laminated body of an image converting layer having a computer generated hologram part with the concavo-convex shape of the hologram master reversed and a transparent substrate.

On the image converting layer of the laminated body produced as mentioned above, a diffraction function layer forming composition having the following composition was coated so as to have the film thickness of 5 μm after drying and UV curing. With removing the solvent by drying (60° C., 1 minute) and curing by the UV irradiation (using an H valve produced by Fusion UV Systems Japan KK., irradiation amount 500 mJ), a diffraction function layer having a 1.83 refractive index (measurement wavelength 633 nm) was formed.

By the above-mentioned method, a hologram layer with a transparent substrate, an image converting layer and a diffraction function layer laminated in this order was produced. The above-mentioned diffraction function layer was formed integrally with the protection layer

| <Composition of the diffraction function layer forming composition> | |
|---|---|
| Titanium oxide (TTO51(C): product name, produced by ISHIHARA SANGYO KAISHA, LTD. I): | 10 parts by weight |
| Pentaerythritol triacrylate (PET30: product name, produced by NIPPON KAYAKU CO., LTD.): | 4 parts by weight |
| Anionic polarity group containing dispersing agent (Disperbyk 163: product name, produced by BYK Chemie Japan KK): | 2 parts by weight |
| Photo polymerization initiating agent (IRGACURE 184: product name, produced by Nihon Ciba-Geigy K.K.): | 0.2 part by weight |
| Methyl isobutyl ketone: | 16.2 parts by weight |

(2) Formation of the Heat Seal Layer

To the both sides of the hologram layer produced by the above-mentioned method, a heat seal layer forming composition having the following composition was applied by screen printing. The thickness of the heat seal layer was provided so as to have a 3 μm dry film thickness.

| <Composition of the heat seal layer forming composition> | |
|---|---|
| Polyester resin (Vylonal MD 1985: produced by TOYOBO., LTD.): | 100 parts by weight |
| Silica fine particles (Sylsia 310P: produced by FUJI SILYSIA CHEMICAL LTD.): | 3 parts by weight |

(3) Production of the Over Sheet

Next, an over sheet as the transparent card substrate was produced. The over sheet was produced by kneading and mixing well a composition for an over sheet having the following composition and supplying the same to a calendar roll. The thickness of the over sheet was 0.1 mm.

| <Composition of the composition for an over sheet> | |
|---|---|
| Vinyl chloride resin: | 100 parts by weight |
| Stabilizing agent: | 4 parts by weight |
| Reinforcing agent: | 5 parts by weight |
| Plasticizing agent: | 2 parts by weight |

(4) Production of the Core Sheet

Next, a core sheet as the transparent card substrate was produced. The core sheet was produced by kneading and mixing well a composition for a core sheet having the following composition and supplying the same to a calendar roll. The thickness of the core sheet was 0.28 mm.

| <Composition of the composition for a core sheet> | |
|---|---|
| Vinyl chloride resin: | 100 parts by weight |
| Infrared absorber | 5 parts by weight |
| (yttria compound based infrared absorber): | |
| Stabilizing agent: | 4 parts by weight |
| Reinforcing agent: | 5 parts by weight |
| Plasticizing agent: | 2 parts by weight |

(5) Production of the Transparent Card with a Hologram

A pattern and a letter were printed on the surface of the core sheet produced by the above-mentioned method by offset printing. Next, to the both sides of the hologram layer with the heat seal layer formed on the both sides, the core sheet and the over sheet were laminated in this order. After thermal fusion in this state by the hot press by the 140° C., 25 kg/cm$^2$, time 15 minutes condition, and cooling, a punching process was carried out to each card size of the ID1 type of the JISX6301 (85.60×53.98 mm) so as to produce a transparent card with a hologram.

By the above-mentioned method, with the refractive index of the image converting layer (1.52) and the refractive index of the diffraction function layer (1.83), a transparent card with an embedded type hologram having a computer generated hologram part of D=1.531 micron, N=4 steps was produced based on the calculation formula. According to the point light source observation through the computer generated hologram part of the produced transparent card with a hologram, a predetermined image with the Fourier transform can be observed.

2. Example 2

(1) Production of the Hologram Layer

By the same method as in the example 1 except that the diffraction function layer was not formed, a hologram layer having the configuration with a transparent substrate and an image converting layer laminated was produced.

(2) Formation of the Heat Seal Layer

By the same method as in the example 1, a 3 μm thickness heat seal layer was formed on the transparent substrate of the hologram layer produced by the above-mentioned method.

(3) Production of the Transparent Card with a Hologram

Using the over sheet and the core sheet produced by the same method as the example 1, after applying printing to the core sheet by the same method as in the example 1, the over sheet/core sheet/core sheet/over sheet/heat seal layer/hologram layer were laminated in this order. After thermal fusion in this state by the hot press by the 140° C., 25 kg/cm$^2$, time 15 minutes condition, and cooling, a punching process was carried out to each card size of the ID1 type of the JISX6301 (85.60×53.98 mm) so as to produce a transparent card with a hologram.

According to the point light source observation through the computer generated hologram part of the produced transparent card with a hologram, a predetermined image with the Fourier transform can be observed.

What is claimed is:

1. An apparatus for recognizing a card with a transmission type Fourier transform lens having a computer generated hologram part comprising a point light source; a supporting part for supporting a card with a transmission type Fourier transform lens having a computer generated hologram part, disposed such that a light from the point light source is incident on the computer generated hologram part of the card with a transmission type Fourier transform lens having a computer generated hologram part; and a light receiving part for receiving the light transmitted the card with a transmission type Fourier transform lens having a computer generated hologram part supported by the supporting part, wherein the point light source, the computer generated hologram part supported by the supporting part, and the light receiving part are disposed in one straight line, wherein the card with a transmission type Fourier transform lens having a computer generated hologram part comprises a configuration with a transparent card substrate made of a resin transparent with respect to a visible light, and a hologram layer having the computer generated hologram part to function as a transmission type Fourier transform lens laminated, wherein the hologram layer is formed in an uppermost layer and has a plural layer structure with a transparent substrate, an image converting layer, a diffraction function layer, and a protection layer, wherein a minute concavo-convex shape on a surface of the hologram layer is multistage, wherein a refractive index of the hologram layer at 633 nm wavelength is in the range of 1.3 to 2.0, and wherein a light transmittance of the transparent card substrate in a visible light range is 80% or more.

2. A card with a transmission type Fourier transform lens having a computer generated hologram part, comprising a configuration with a transparent card substrate made of a resin transparent with respect to a visible light, and a hologram layer having a computer generated hologram part to function as a transmission type Fourier transform lens laminated, wherein the hologram layer is formed in an uppermost layer and has a plural layer structure with a transparent substrate, an image converting layer, a diffraction function layer, and a protection layer, wherein a minute concavo-convex shape on a surface of the hologram layer is multistage, wherein a refractive index of the hologram layer at 633 nm wavelength is in the range of 1.3 to 2.0, and wherein a light transmittance of the transparent card substrate in a visible light range is 80% or more.

* * * * *